(12) United States Patent
Shastry et al.

(10) Patent No.: US 8,719,154 B2
(45) Date of Patent: May 6, 2014

(54) REPUTATION INTEGRATION INTO REMITTANCE DELIVERY

(75) Inventors: Vishwanath Shastry, Palo Alto, CA (US); Kristen Ondeck, San Jose, CA (US); David Jesse, Mountain View, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 11/642,030

(22) Filed: Dec. 19, 2006

(65) Prior Publication Data

US 2008/0147540 A1   Jun. 19, 2008

(51) Int. Cl.
*G06Q 40/00* (2012.01)

(52) U.S. Cl.
USPC .......................................................... 705/39

(58) Field of Classification Search
USPC .......................................................... 705/39
See application file for complete search history.

(56) References Cited

U.S. PATENT DOCUMENTS

| | | | | |
|---|---|---|---|---|
| 2002/0062280 A1* | 5/2002 | Zachariassen et al. | ......... | 705/39 |
| 2003/0036921 A1* | 2/2003 | Ito et al. | .......................... | 705/1 |
| 2004/0039692 A1* | 2/2004 | Shields et al. | ................. | 705/39 |
| 2004/0107129 A1* | 6/2004 | Langen | ........................... | 705/10 |
| 2007/0073618 A1* | 3/2007 | Yu et al. | ........................... | 705/40 |
| 2007/0203852 A1* | 8/2007 | Cameron et al. | ................ | 705/75 |
| 2007/0299920 A1* | 12/2007 | Crespo et al. | ................ | 709/206 |

OTHER PUBLICATIONS

Thomas Barnwell, Victor Beliakov. Asian Business. Hong Kong 1999. vol. 35, Iss, 11; p. 41,1pgs.*
Profit and duty in the Second Bank of the United States' exchange operations Knodell, Jane. Financial History Review 10.1 (Apr. 2003): 5-30.*
The prospects and challenges facing GCC banks and future policy directions and strategies : Bhattacharyay, Biswa N. The International Journal of Bank Marketing 13.1 (1995): 35.*
Choose the right accounting program! Zuckerman, Laurence K. Accounting Technology 10.5 (Jun. 1994): 37.*

* cited by examiner

*Primary Examiner* — Hani M Kazimi
*Assistant Examiner* — Hatem Ali
(74) *Attorney, Agent, or Firm* — Schwegman, Lundberg & Woessner, P.A.

(57) ABSTRACT

One embodiment provides a method of delivering a remittance from a first party to a third party via an intermediary party, in which an intermediary fee is chargeable by the intermediary party. The method includes: receiving, at a payment system, a request to conduct a remittance transaction including a transfer of a first value from a first party to an account of an intermediary party, and by the intermediary party to transfer at least a portion of the first value to a third party; accessing reputation data associated with the intermediary party; and determining an intermediary fee chargeable by the intermediary party for the transfer of at least the portion of the first value to the third party, the determining of the intermediary fee being based on the reputation data. The reputation data can be information about the intermediary party, as well as the first party and/or the third party.

33 Claims, 7 Drawing Sheets

REPUTATION INTEGRATION INTO REMITTANCE DELIVERY

TECHNICAL FIELD

The present application relates to a method and system for delivering a remittance from a first party to a third party through an intermediary party over networks.

BACKGROUND

With the development of computer and network related technologies, more users communicate over networks and participate e-commerce transactions, e.g. selling/buying items, bidding on goods, or transferring money over networks, thus, the trust and reputation of the parties involved in e-commerce transactions have important impacts on the initiation and success of the e-commerce transactions.

BRIEF DESCRIPTION OF THE DRAWINGS

Some embodiments are illustrated by way of examples, and not by way of limitations, in the figures of the accompanying drawings in which.

DETAILED DESCRIPTION

Example methods and systems to deliver a remittance from a first party to a third party through an intermediary party are described. In the following description, for purposes of explanation, numerous specific details are set forth in order to provide a thorough understanding of example embodiments. It will be evident, however, to one skilled in the art that the embodiments of the invention may be practiced without these specific details.

The term "remittance" used in the following description denotes "a money transfer between any two parties", the term "intermediary party" denotes "a franchisee designated by a first party and/or third party for a remittance", and the term "intermediary fee" denotes "the service charge by the intermediary party for the remittance transfer".

Figure 1:
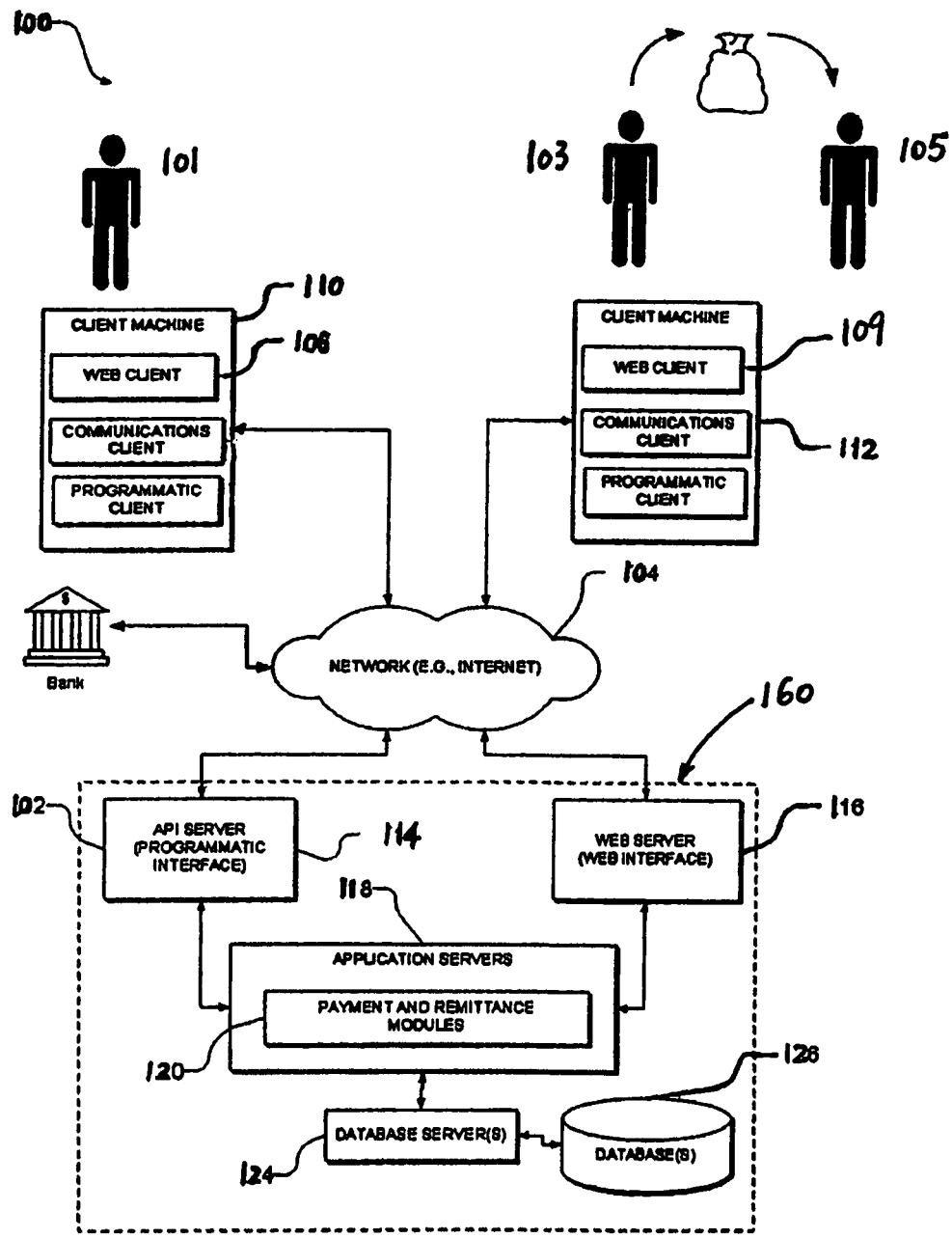
FIG. 1 is an overview diagram illustrating a remittance delivery system having a client-server architecture configured for exchanging data over a network in accordance with an embodiment of the application.

FIG. 1 is an overview diagram illustrating a network system 100 having a client-server architecture configured for exchanging data over a network 104 in accordance with an embodiment of the application.

In the embodiment, by virtue of the network system 100, a first party 101 may transfer a remittance to a third party 105 via an intermediary party 103, and the intermediary party 103 may charge an intermediary fee which is determined based on the reputation of the intermediary party 103.

In another embodiment, the intermediary fee is also determined based on the reputation and/or risk scores of the first party 101 and/or the third party 105.

In some embodiments, the network system 100 has a client-server architecture configured for exchanging data over a network. The data may relate to various functions associated with the network system 100, for example, transferring remittances online, determining reputation of an intermediary party, determining intermediary fee of the intermediary party. Although illustrated herein as a client-server architecture for simplicity, in other embodiments the network architecture may vary and include another kind of architecture, for example, a peer machine in a peer-to-peer or distributed network environment.

In some embodiments, a network-based marketplace (payment and remittance system) 160 provides a platform, where a first party 101 and/or a third party 105 can choose an intermediary party 103 as a franchisee to transfer remittance based on the reputation data/score as well as other factors, like the price, the location, business hours of the intermediary party 103.

The network-based marketplace 160 forms a data exchange platform and provides, via a network 104, server-side functionalities to one or more clients. The one or more clients may utilize the network-based marketplace 160 to exchange data over the network 104. The data exchanged may include, but is not limited to, a fee schedule defined by the intermediary party 103, reputation data of an intermediary party 103 (such as a total number of transactions conducted by the intermediary party 103, a number of successful transactions conducted by the intermediary party 103, a total value of transactions conducted by the intermediary party 103 over a predetermined amount of time, and feedback data received in connection with transactions conducted by the intermediary party 103), as well as reputation data and/or risk scores of a first party 101 and/or a third party 105.

In some embodiments, the network-based marketplace 160 includes an application program interface (API) server 114 and a web server 116, which are coupled to an application server 118, provide programmatic interface and web interface respectively to the application server 118. In an embodiment, the application server 118 hosts payment and remittance modules 120. The application server 118 is coupled to one or more databases servers 124 that facilitate access to one or more databases 126.

In some embodiments, the API server 114 or the web server 116 may send, and receive data pertaining to the reputation of a merchant. In an embodiment, the API server 114 may send and receive data to and from an application running on another client machine, e.g., a client machine 110 or 112. The web server 116 may send and receive data to and from a webpage on a browser application, e.g., a web client 106 or 109, operating on the client machine 110 or 112. In another embodiment, the first party 101 may use a mobile device (e.g., a cell phone, not shown in FIG. 1) instead of a client machine 110 in FIG. 1 as an interface for communicating with the network-based marketplace 160 to initiate/complete the remittance transaction, as well as to update reputation data about the intermediary party 103.

Figure 2:
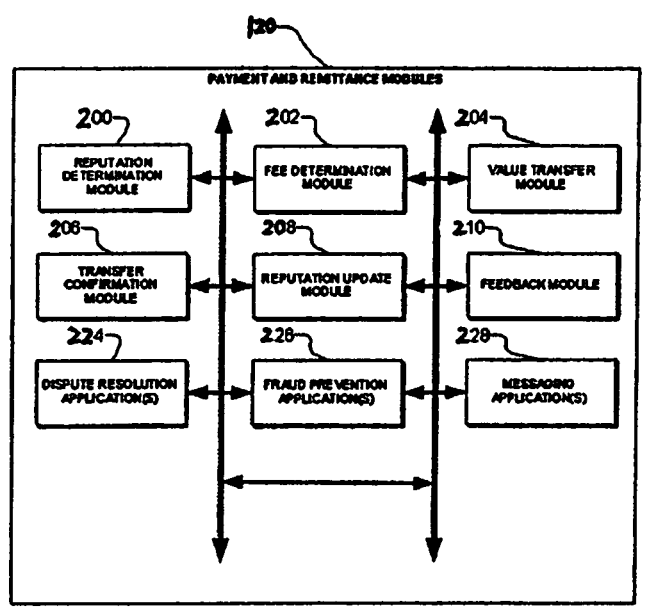
FIG. 2 is a block diagram illustrating payment and remittance modules in accordance with an embodiment of the application.

FIG. 2 is a block diagram illustrating payment and remittance modules in accordance with an embodiment of the application.

In some embodiments, the payment and remittance modules 120 may provide a number of functions and services to users of the network-based marketplace 160. The payment and remittance modules 120 may include, but are not limited to, reputation determination module 200, fee determination module 202, value transfer module 204, transfer confirmation module 206, reputation update module 208, feedback module 210, dispute resolution applications 224, fraud prevention applications 226, and messaging applications 228.

In some embodiments, the payment network-based marketplace 160 includes a web interface 116, a reputation determination module 200, a fee determination module 202, and a value transfer module 204. The web interface 116 receives a request to conduct a remittance transaction to transfer at least a portion of a first value from an account of a first party 101 to an account of a third party 105 via an intermediary party 103. The reputation determination module 200 accesses a database 126 via a database server 124 to obtain reputation data associated with the intermediary party 103.

In an embodiment, the reputation data about the intermediary party 103 is a number of transactions conducted by the intermediary party 103. In another embodiment, the reputation data about the intermediary party 103 is a value of transactions conducted by the intermediary party 103 over a predetermined amount of time. In another embodiment, the reputation data about the intermediary party 103 is feedback data received in connection with transactions conducted by the intermediary party 103 from the first party 101 and/or the third party 105. In another embodiment, the reputation data about the intermediary party 103 is a number of successful transactions conducted by intermediary party 103.

In some embodiments, the fee determination module 202, based on the reputation data of the intermediary party 103, determines an intermediary fee chargeable by the intermediary party 103 for transferring the at least a portion of the first value to the third party 105. The reputation of an intermediary party 103, e.g., a franchisee, may affect the trust and preference of the users, as well as the service rate of the intermediary party 103. For example, an intermediary party 103 having done more (e.g. 500) transactions successfully charges a higher (e.g. $10) withdrawal fee, while another intermediary party 103 having done less (e.g. 10) transactions successfully charges a lower (e.g. $2) withdrawal fee in order to build up its reputation.

In an embodiment, the fee determination module 202 also takes a fee schedule defined by the intermediary party 103 as a factor (or input) to determine the intermediary fee chargeable by the intermediary party 103 for transferring the at least a portion of the first value to the third party 105.

In another embodiment, the fee determination module 202 also takes the reputation data and/or risk scores of the first party 103 and/or the third party 105 as a factor to determine an intermediary fee chargeable by the intermediary party 103 for transferring the at least a portion of the first value to the third party 105. The intermediary party 103 may choose to change the intermediary fee based on reputation data and/or risk scores of the first party 101 and/or the third party 105. For example, the intermediary party 103 sees that the first party 101 has a history of routinely initiating chargebacks and/or requesting refunds on transactions, the intermediary party 103 may choose to accept the remittance transaction, but charge a higher intermediary fee to cover the risk of the remittance transaction.

In some embodiments, the value transfer module 204 transfers the first value from the account of the first party 101 to the account of the intermediary party 103. In an embodiment, the value transfer module 204 deducts the intermediary fee from the first value, and retains the intermediary fee in the account of the intermediary party 103. In another embodiment, the value transfer module 204 credits the account of the intermediary party 103 with the intermediary fee, and debits the account of the first party 101 with the intermediary fee.

In some embodiments, the network-based marketplace 160 further includes a transfer confirmation module 206, coupled to the value transfer module 204, to provide confirmation of the transfer of at least a portion of the first value to the third party 105. The value transfer module 204 credits the account of the intermediary party 103 with the intermediary fee responsive to receiving a confirmation from the transfer confirmation module 206 of the transfer of at least a portion of the first value to the third party 105. The transfer of at least a portion of the first value from the intermediary party 103 to the third party 105, for example, can be a physical transfer of money.

In an embodiment, the transfer confirmation module 206 receives a confirmation of the transfer of at least a portion of the first value to the third party 105 is received from the third party 105. In another embodiment, the transfer confirmation module 206 receives confirmation of the transfer of at least a portion of the first value to the third party 105 is received from the intermediary party 103.

In some embodiments, the payment and remittance system 160 further includes a reputation update module 208 to update the reputation data associated with the intermediary party 103 based on the remittance transaction conducted. The feedback module 208 may receive the feedback information from the first party 101 and/or the third party 105.

In one embodiment, the reputation update module 208 updates a count of remittance transactions conducted by the intermediary party 105. In another embodiment, the reputation update module 208, after determining that the remittance transaction has been successfully completed, updates a count of successful remittance transactions completed by the intermediary party 103. In another embodiment, from a feedback module 210, the reputation update module 208 receives feedback information regarding the remittance transaction from the first party 101 and/or the third party 105 and updates the reputation data based on the received feedback information.

In some embodiments, in conjunction with one or more weighting functions and transaction attributes, the feedback module 210 uses the feedback provided by the first party 101 and/or the third party 105 about the intermediary party 103 to determine a new feedback value about the intermediary party 103, and then the reputation module 208 updates the reputation value about the intermediary party 103 based on the new feedback value. For example, the one or more weighting functions may be applied among feedback indicators, such as negative, neutral, and positive, to produce a weighted value for the new feedback value, which is from either the first party 101 or the third party 105. If the weighted value is less than zero, it would result in a negative impact on the existing feedback value, and if greater than zero, a positive impact. If the first party 101 or the third party 105 does not leave any feedback, the feedback module 210 would by default assume a neutral impact. The reputation of the intermediary party 103 may suffer based on past transaction feedback. For example, the intermediary party's reputation may decline based on how many negative transactions the intermediary party has conducted.

In other embodiments, the feedback module 210 may conduct a credit check to obtain feedback scores about an intermediary party 103 from a third party source, e.g. from a bank, a financial entity, or a commercial entity.

In some embodiments, a messaging application 228 of the network-based marketplace 160 may be used to deliver messages among users of the network-based marketplace 160. The messages may be used by the payment and remittance system 160, the first party 101, the third party 105, or the intermediary party 103 to communicate or exchange information.

In an embodiment, the messaging application 228 may be used in conjunction with a dispute resolution application 224 to settle down disputes involved in remittance transactions among the first party 101, the third party 105, and the intermediary party 103.

In another embodiment, the messaging application 228 may be used in conjunction with a fraud prevention application 226 to prevent frauds, which might happen during the process of the remittance transaction.

Figure 3:
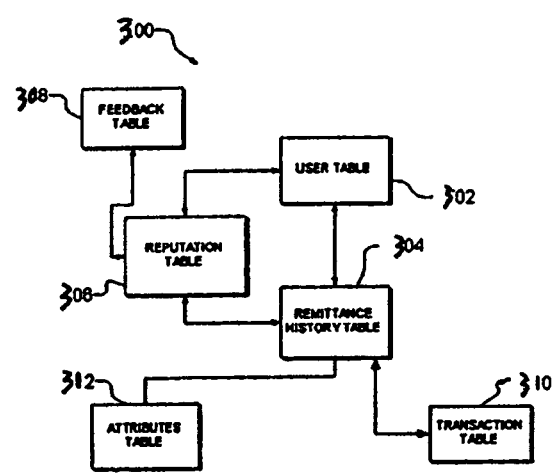
FIG. 3 is a high level entity-relationship diagram illustrating an embodiment of various tables maintained in a database.

FIG. 3 is a high level entity-relationship diagram illustrating one embodiment of various tables 300 that may be maintained in the database 226 shown in FIG. 1. These tables 300 may be utilized by and support the payment and remittance modules 120.

In some embodiments, a user table 302 may contain a record for each registered user of the network-based marketplace 160, which may include an identifier, an address and financial instrument information pertaining to each registered user. For example, a user may operate as a first party 101, a third party 105, or an intermediary party 103 within the payment and remittance modules 120.

In some embodiments, a remittance history table 304 may contain a record for each remittance transaction performed via the network-based marketplace 160 during a certain period of time. For example, remittance history table 304 may contain a remittance transaction identifier, the identifier of each of the first party 101, the third party 105 and the intermediary party 103, dates showing when the first party 101 requests the remittance transaction and when the remittance transaction is completed, the value of the remittance transaction requested, and an attribute identifier of the remittance transaction.

In some embodiments, a transaction table 310 may further contain more detailed information of each remittance transaction than the information maintained in remittance history table 304. For example, the transaction table 310 may further contain the information about the intermediary fee charged by the intermediary party 103.

In some embodiments, an attribute table 312 may contain attribute identifier, and attributes of a transaction, e.g. indicating whether the intermediary fee is paid by the first party 101 or by the third party 105.

In some embodiments, a reputation table 306 may contain an identifier of the each intermediary party 103, and reputation data of the each intermediary party 103 registered in of the network-based marketplace 160.

In some embodiments, a feedback table 308 may be utilized by the feedback module 210 to construct and maintain reputation information in the form of feedback values about the intermediary party 103 of the network-based marketplace 160. For example, the feedback values about the intermediary party 103 in the feedback table 308 can be used to update the reputation values about the intermediary party 103 in the reputation table 306.

Figures 4, 5:
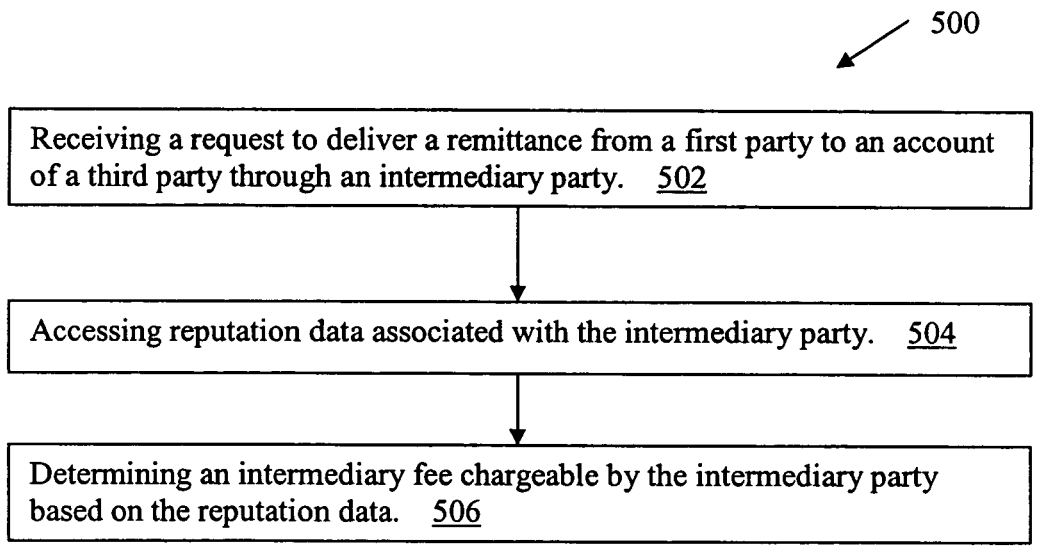
FIG. 4 is a chart illustrating data structure of a reputation table in accordance with an embodiment of the application.
FIG. 5 is a flowchart illustrating a method of determining an intermediary fee chargeable by an intermediary party, through which the remittance is transferred, in accordance with an embodiment of the application.

FIG. 4 illustrates data structure of a reputation table 306 in accordance with an embodiment illustrated in FIG. 3.

In some embodiments, the fields or columns of the reputation table 306 shown in FIG. 4 include an identifier of the intermediary party 103, a number of transactions conducted by the intermediary party 103, a number of positive feedbacks from the first party 101 or the third party 105, a number of negative feedbacks from the first party 101 or the third party 105, and a total value successfully transferred by the intermediary party 103.

FIG. 5 illustrates a method of determining an intermediary fee chargeable by an intermediary party, through which the remittance is transferred, in accordance with an embodiment of the application.

At 502 of the embodiment, via the web server 116, the application server 118 receives a request to deliver a remittance from a first party 101 to an account of a third party 105 through an intermediary party 103.

At 504, in some embodiments, the reputation determination module 200 access reputation data associated with the intermediary party 103. In an embodiment, the reputation data associated with the intermediary party 103 is stored in database(s) 126. In other embodiments, at 504, the reputation determination module 200 also access reputation data and/or risk scores of a first party 101 and/or a third party 105 stored in database(s) 126 or populated from other systems.

In an embodiment, the reputation data associated with the intermediary party 103 includes a number of remittance transactions conducted by the intermediary party 103. In another embodiment, the reputation data associated with the intermediary party 103 is based on a value of remittance transactions conducted by the intermediary party 103 over a predetermined amount of time. In another embodiment, the reputation data associated with the intermediary party 103 includes feedback data received in connection with remittance transactions conducted by the intermediary party 103. In one embodiment, the feedback data is received from the first party 101. In another embodiment, the feedback data is received from the third party 105. In another embodiment, the reputation data associated with the intermediary party 103 includes a number of successful remittance transactions conducted by the intermediary party 103.

Then, at 506, the fee determination module 202 determines an intermediary fee chargeable by the intermediary party 103 based on the reputation data about the intermediary party 103 accessed at 504.

In some embodiments, at 506, the fee determination module 202, based on the reputation data of the intermediary party 103, determines an intermediary fee chargeable by the intermediary party 103 for transferring the at least a portion of the first value to the third party 105.

In an embodiment, at 506, the fee determination module 202 also takes a fee schedule defined by the intermediary party 103 as a factor or an input to determine the intermediary fee chargeable by the intermediary party 103 for transferring the at least a portion of the first value to the third party 105.

In another embodiment, at 506, the fee determination module 202 also takes the reputation data and/or risk scores of the first party 103 and/or the third party 105 as a factor to determine an intermediary fee chargeable by the intermediary party 103 for transferring the at least a portion of the first value to the third party 105. The intermediary party 103 may choose to change the intermediary fee based on reputation data and/or risk scores of the first party 103 and/or the third party 105. For example, the intermediary party 103 sees that the first party 101 has a history of routinely initiating chargebacks and/or requesting refunds on transactions, the intermediary party 103 may choose to accept the remittance transaction, but charge a higher intermediary fee to cover the risk of the remittance transaction.

Figure 6:
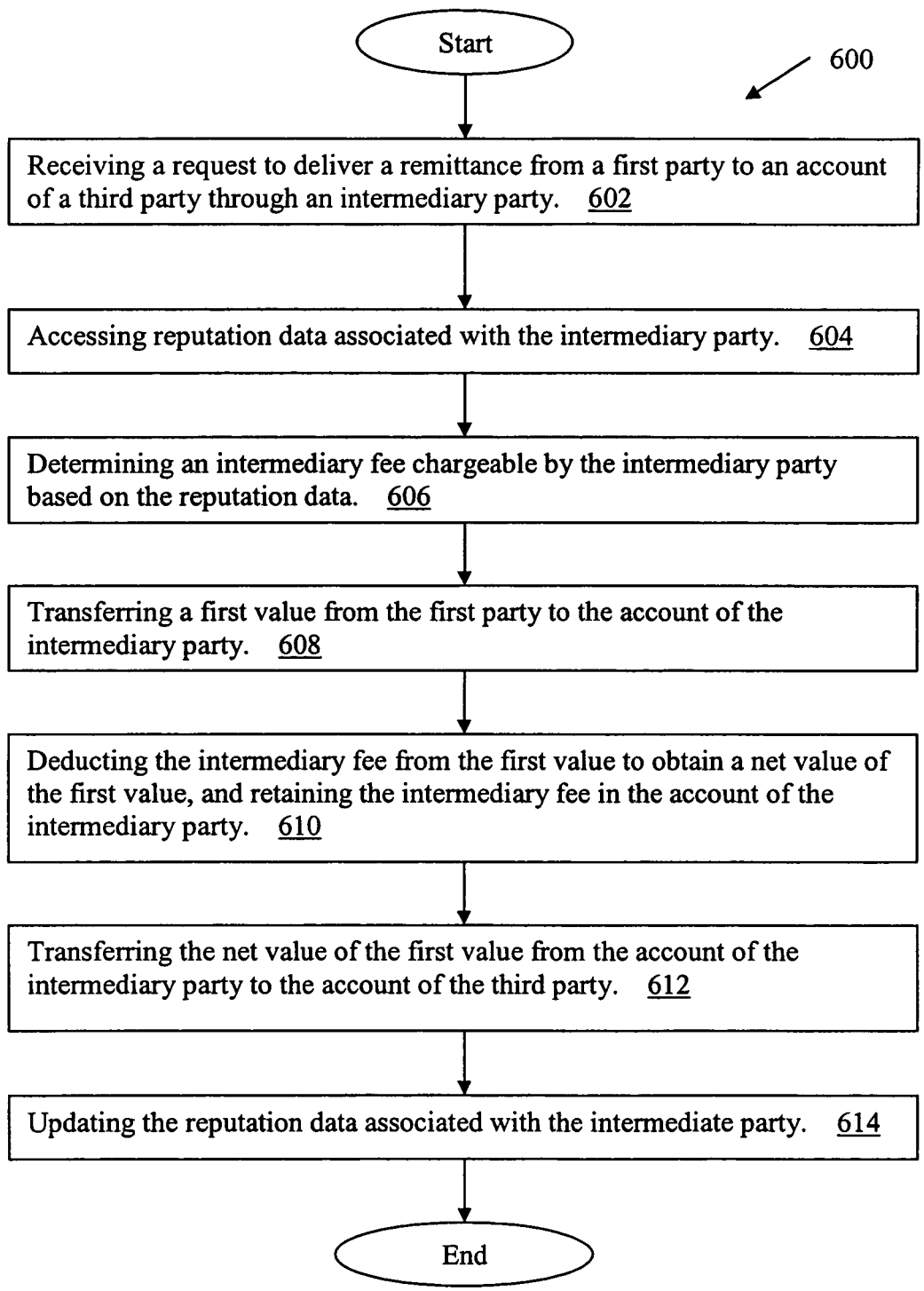
FIG. 6 is a flowchart illustrating a method of delivering a remittance from a first party to an account of a third party through an intermediary party in accordance with an embodiment of the application.

FIG. 6 illustrates a method of delivering a remittance from a first party to an account of a third party through an intermediary party in accordance with an embodiment of the application.

In the embodiment, at 602, the messaging application 228 receives a request to deliver a remittance from an account of a first party 101 to an account of a third party 105 through an intermediary party 103.

In an embodiment, at 602, the remittance is transferred from an account of the first party 101 to the account of the intermediary party 103.

In another embodiment, at 602, the remittance is transferred from the first party 101 in cash to the account of the intermediary party 103.

At 604 of the embodiment, the reputation determination module 200 accesses reputation data associated with the intermediary party 103. In an embodiment, the reputation determination module 200 obtains the reputation data associated with the intermediary party 103 from a database 126.

At 606, the fee determination module 202 determines an intermediary fee chargeable by the intermediary party 103 based on the reputation data accessed at 604.

At 608, the value transfer module 204 transfers a first value from the first party 101 to the account of the intermediary party 103.

At 610, the value transfer module 204 deducts the intermediary fee from the first value of the first party 101 to obtain a net value of the first value, and retains the intermediary fee in the account of the intermediary party 103.

At 612, in an embodiment, the value transfer module 204 transfers the net value of the first value from the account of the intermediary party 103 to the account of the third party 105. In another embodiment, the transfer of the net value of the first value from the intermediary party 103 to the third party 105 is a physical transfer of money, i.e., person-to-person cash transfer.

Then, at 614, the reputation update module 208 updates the reputation data associated with the intermediate party 103.

In an embodiment, after the remittance completed, the reputation update module 208 updates the number of remittance transactions conducted by the intermediary party 103, and saves the number in the reputation table 306 shown in FIG. 4.

In another embodiment, after the transfer confirmation module 206 confirming that the remittance transaction has been successfully completed, the reputation update module 208 updates the count of successful remittance transactions completed by the intermediary party 103, and saves the count in the reputation table 306 shown in FIG. 4.

In another embodiment, the reputation update module 208 receives feedback information in connection with the completed remittance transaction, updates the reputation data associated with the intermediary party 103 based on the received feedback information, and saves the reputation data in the reputation table 306 shown in FIG. 4. The feedback information is received from either the first party 101 or the third party 105.

Figure 7:
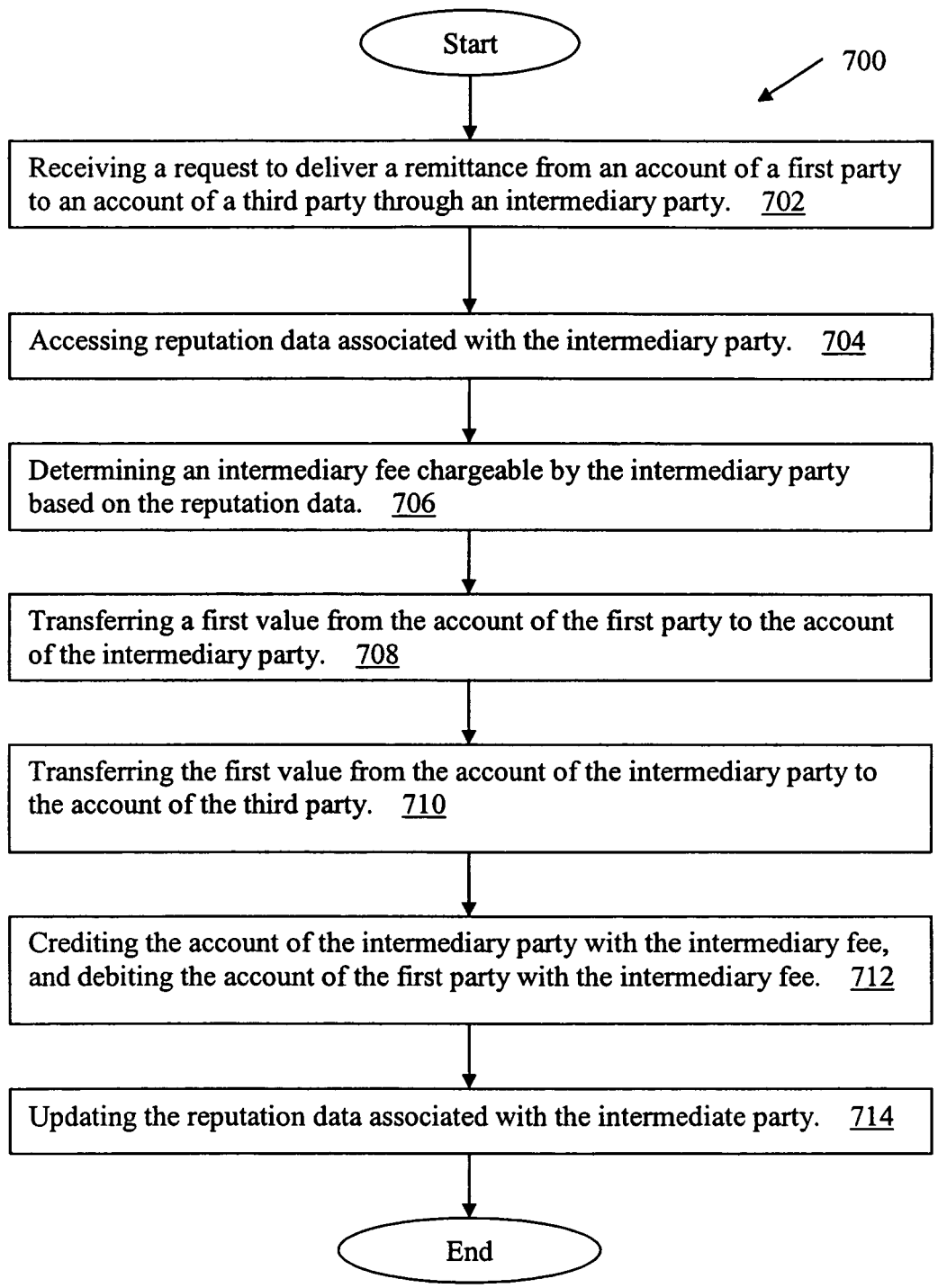
FIG. 7 is a flowchart illustrating a method of delivering a remittance from an account of a first party to an account of a third party through an intermediary party in accordance with another embodiment of the application.

FIG. 7 illustrates a method of delivering a remittance from an account of a first party to an account of a third party through an intermediary party in accordance with another embodiment of the application.

In the embodiment, at 702, the payment and remittance modules 120 receive a request to deliver a remittance from an account of a first party 101 to an account of a third party 105 through an intermediary party 103.

At 704, the payment and remittance modules 120 access reputation data associated with the intermediary party 103. In an embodiment, the reputation data associated with the intermediary party 103 is stored in database(s) 126.

At 706, the payment and remittance modules 120 determine an intermediary fee chargeable by the intermediary party 103 based on the reputation data accessed at 604.

At 708, the payment and remittance modules 120 transfer a first value from the account of the first party 101 to the account of the intermediary party 103.

At 710, the payment and remittance modules 120 transfer the first value from the account of the intermediary party 103 to the account of the third party 105.

At 712, the payment and remittance modules 120 credit the account of the intermediary party 103 with the intermediary fee, and debit the account of the first party 101 with the intermediary fee. In an embodiment, after the transfer confirmation module 206 receives a confirmation of the successful remittance transfer of the net value of the first value to the third party 105, the value transfer module 204 credits the account of the intermediary party 103 with the intermediary fee determined at 706.

Then, at 714, the payment and remittance modules 120 updates the reputation data associated with the intermediate party 103.

In an embodiment, after the remittance completed, the reputation update module 208 updates the count of remittance transactions conducted by the intermediary party 103, and saves the count in the reputation table 306 shown in FIG. 4.

In another embodiment, after the transfer confirmation module 206 confirming that the remittance transaction has been successfully completed, the reputation update module 208 updates the count of successful remittance transactions completed by the intermediary party 103, and saves the count in the reputation table 306 shown in FIG. 4.

In another embodiment, the reputation update module 208 receives feedback information in connection with the completed remittance transaction, updates the reputation data associated with the intermediary party 103 based on the received feedback information, and saves the reputation data in the reputation table 306 shown in FIG. 4. The feedback information is received from either the first party 101 or the third party 105.

Figure 8:
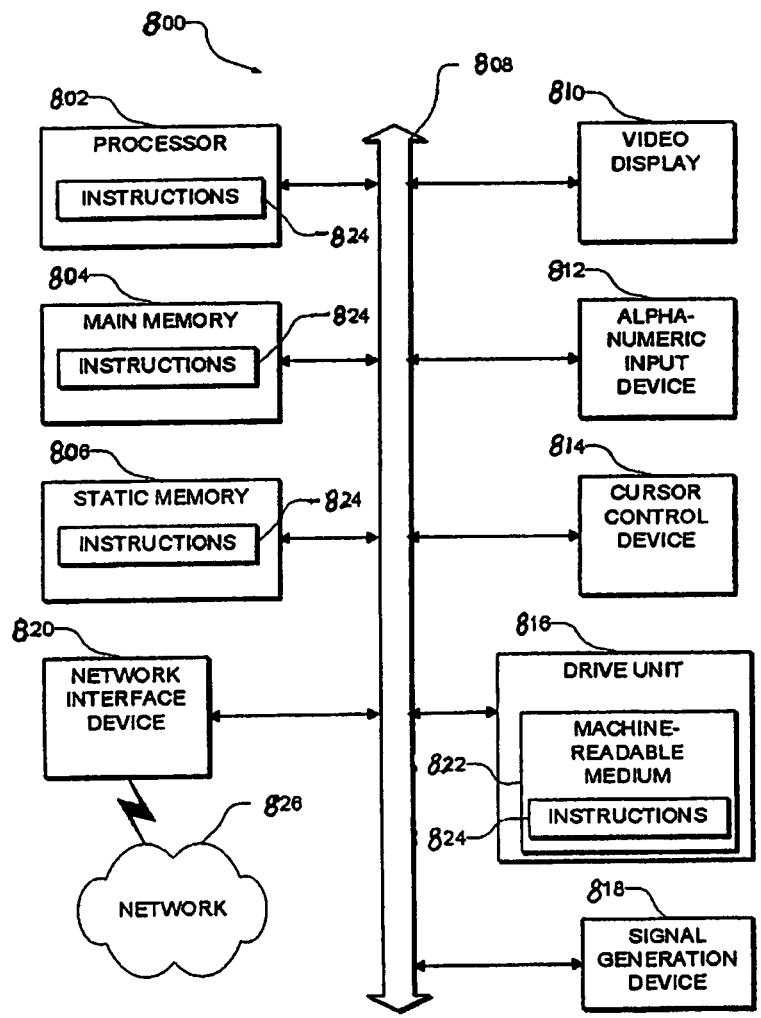
FIG. 8 is a block diagram illustrating a machine in the example form of a computer system, within which a set of sequence of instructions for causing the machine to perform any one of the methodologies discussed herein may be executed.

FIG. 8 is a block diagram illustrating a machine in the example form of a computer system 800, within which a set of sequence of instructions for causing the machine to perform any one of the methodologies discussed herein may be executed. In alternative embodiments, the machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions that specify actions to be taken by that machine. Further, while only a single machine is illustrated, the term "machine" shall also be taken to include any collection of machines that individually or jointly execute a set of instructions to perform any one or more of the methodologies discussed herein.

The example computer system 800 includes a processor 802 (e.g., a central processing unit (CPU) a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions (e.g., software 824) embodying any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, methods and systems for remittance delivery from a first party to a third party through an intermediary party have been described. Although the present invention has been described with reference to specific embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system of a network-based marketplace, comprising:
a web or API server including an interface to receive a request to conduct a remittance transaction including a transfer of a first value from a first party to an account of an intermediary party, and by the intermediary party to transfer at least a portion of the first value to a third party; and
an application server including: a reputation determination module to access reputation data associated with the intermediary party; and
a fee determination module to determine, based on the reputation data, an intermediary fee chargeable by the intermediary party for the transfer of at least the portion of the first value to the third party, the reputation data including a value of remittance transactions previously conducted by the intermediary party over a predetermined amount of time, wherein the more the value of remittance transactions previously conducted by the intermediary party, the more the intermediary fee.

2. The system of claim 1, comprising a value transfer module to transfer the first value from the first party to the account of the intermediary party.

3. The system of claim 1, comprising a value transfer module to transfer the first value from an account of the first party to the account of the intermediary party.

4. The system of claim 1, comprising a value transfer module to transfer the first value in cash from the first party to the account of the intermediary party.

5. The system of claim 1, wherein the determining of the intermediary fee is also based on a fee schedule defined by the intermediary party.

6. The system of claim 2, wherein the value transfer module is to deduct the intermediary fee from the first value, and to retain the intermediary fee in the account of the intermediary party.

7. The system of claim 3, wherein the value transfer module is to credit the account of the intermediary party with the intermediary fee.

8. The system of claim 3, wherein the value transfer module is to debit the account of the first party with the intermediary fee.

9. The system of claim 2, comprising a transfer confirmation module, coupled to the value transfer module, to provide confirmation of the transfer of at least the portion of the first value to the third party, and wherein the value transfer module is to credit the account of the intermediary party with the intermediary fee responsive to receiving a confirmation from the transfer confirmation module of the transfer of at least the portion of the first value to the third party.

10. The system of claim 9, wherein the transfer of at least the portion of the first value from the intermediary party to the third party is a physical transfer of money.

11. The system of claim 9, wherein the transfer confirmation module is to receive confirmation of the transfer of at least the portion of the first value to the third party is received from the third party.

12. The system of claim 9, wherein the transfer confirmation module is to receive confirmation of the transfer of at least the portion of the first value to the third party is received from the intermediary party.

13. The system of claim 2, wherein the reputation data includes a number of remittance transactions conducted by the intermediary party.

14. The system of claim 2, wherein the reputation data includes feedback data received from the first party and/or the third party in connection with remittance transactions conducted by the intermediary party.

15. The system of claim 2, comprising a reputation update module to update the reputation data associated with the intermediary party based on the remittance transaction.

16. The system of claim 15, wherein the reputation update module is to update a count of remittance transactions conducted by the intermediary party.

17. The system of claim 15, wherein the reputation update module is to determine that the remittance transaction has been successfully completed, and to update a count of successful remittance transactions completed by the intermediary party.

18. The system of claim 15, wherein the reputation update module is to receive feedback information in connection with the remittance transaction from a feedback module, and to update the reputation data based on the received feedback information.

19. A method of delivering a remittance over a network, comprising:
receiving, by an interface of a web or API server included in a payment system, a request to conduct a remittance transaction including a transfer of a first value from a first party to an account of an intermediary party, and by the intermediary party to transfer at least a portion of the first value to a third party;

accessing, by a reputation determination module of an application server included in the payment system, reputation data associated with the intermediary party; and determining, by a fee determination module of the application server included in the payment system, based on the reputation data, an intermediary fee chargeable by the intermediary party for the transfer of at least the portion of the first value to the third party, the reputation data including a value of remittance transactions previously conducted by the intermediary party over a predetermined amount of time, wherein the more the value of remittance transactions previously conducted by the intermediary party, the more the intermediary fee.

20. The method of claim 19, further comprising transferring the first value from the account of the first party to the account of the intermediary party.

21. The method of claim 19, further comprising transferring the first value in cash value from the first party to the account of the intermediary party.

22. The method of claim 19, wherein the determining the intermediary fee is also based upon a fee schedule defined by the intermediary party.

23. The method of claim 20, further comprising deducting the intermediary fee from the first value, and retaining the intermediary fee in the account of the intermediary party at the payment system.

24. The method of claim 20, further comprising, crediting the account of the intermediary party with the intermediary fee at the payment system.

25. The method of claim 24, further comprising, debiting the account of the first party with the intermediary fee at the payment system.

26. The method of claim 24, further comprising, crediting, at the payment system, the account of the intermediary party with the intermediary fee responsive to confirmation of the transferring of at least the portion of the first value to the third party.

27. The method of claim 26, wherein the transferring of at least the portion of the first value from the intermediary party to the third party is physically transferring money.

28. The method of claim 20, further comprising confirming the transferring of at least the portion of the first value to the third party.

29. The method of claim 20, wherein the confirmation of the transferring of at least the portion of the first value to the third party is received from the third party or the intermediary party.

30. The method of claim 20, wherein the reputation data includes data indicating a number of remittance transactions conducted by the intermediary party.

31. The method of claim 20, wherein the reputation data includes feedback data received from the first party and/or the third party in connection with remittance transactions conducted by the intermediary party.

32. The method of claim 20, comprising updating the reputation data associated with the intermediary party with information based upon the remittance transaction.

33. A machine readable medium embodying instructions, which when executed by a machine, cause the machine to perform a method including:

receiving, by a server interface of a server included in a payment system, a request to conduct a remittance transaction including a transfer of a first value from a first party to an account of an intermediary party, and by the intermediary party to transfer at least a portion of the first value to a third party;

accessing, by an application server included in the payment system, reputation data associated with the intermediary party; and determining, by the application server included in the payment system, based on the reputation data, an intermediary fee chargeable by the intermediary party for the transfer of at least the portion of the first value to the third party, the reputation data including a value of remittance transactions previously conducted by the intermediary party, wherein the more the value of remittance transactions previously conducted by the intermediary party, the more the intermediary fee, and wherein the intermediary fee is changeable by the intermediary party based on reputation data associated with at least one of the first party and the third party.

* * * * *

UNITED STATES PATENT AND TRADEMARK OFFICE
CERTIFICATE OF CORRECTION

| | | |
|---|---|---|
| PATENT NO. | : 8,719,154 B2 | Page 1 of 1 |
| APPLICATION NO. | : 11/642030 | |
| DATED | : May 6, 2014 | |
| INVENTOR(S) | : Shastry et al. | |

It is certified that error appears in the above-identified patent and that said Letters Patent is hereby corrected as shown below:

IN THE CLAIMS:

In column 9, line 50, in Claim 1, after "including:", insert --¶--, therefor

Signed and Sealed this
Second Day of December, 2014

Michelle K. Lee
*Deputy Director of the United States Patent and Trademark Office*